US010989085B1

(12) United States Patent
Jung

(10) Patent No.: US 10,989,085 B1
(45) Date of Patent: Apr. 27, 2021

(54) EMISSION-FREE COLD-START AND WARM-START OF INTERNAL COMBUSTION ENGINES

(71) Applicant: Philip Owen Jung, Mobile, AL (US)

(72) Inventor: Philip Owen Jung, Mobile, AL (US)

(*) Notice: Subject to any disclaimer, the term of this patent is extended or adjusted under 35 U.S.C. 154(b) by 23 days.

(21) Appl. No.: 16/887,277

(22) Filed: May 29, 2020

(51) Int. Cl.
| | | |
|---|---|---|
| *F02D 41/06* | (2006.01) | |
| *F01N 3/20* | (2006.01) | |
| *F02D 41/00* | (2006.01) | |
| *F02M 25/12* | (2006.01) | |
| *F02D 41/02* | (2006.01) | |
| *F02B 43/10* | (2006.01) | |
| *F02N 11/08* | (2006.01) | |

(52) U.S. Cl.
CPC .......... *F01N 3/2006* (2013.01); *F02D 41/005* (2013.01); *F02D 41/0027* (2013.01); *F02D 41/0255* (2013.01); *F02D 41/064* (2013.01); *F02D 41/068* (2013.01); *F02M 25/12* (2013.01); *F01N 3/2066* (2013.01); *F01N 2240/36* (2013.01); *F01N 2610/02* (2013.01); *F02B 2043/106* (2013.01); *F02D 41/065* (2013.01); *F02N 11/08* (2013.01)

(58) Field of Classification Search
CPC ............ F01N 2240/02; F01N 2240/34; F01N 2240/36; F02B 43/10; F02B 2043/106; F02D 19/0644; F02M 21/0206; F02M 25/12; F02M 2700/4321
See application file for complete search history.

(56) References Cited

U.S. PATENT DOCUMENTS

| | | |
|---|---|---|
| 3,862,624 A | 1/1975 | Underwood |
| 5,425,233 A | 6/1995 | Ma |

(Continued)

FOREIGN PATENT DOCUMENTS

| | | |
|---|---|---|
| DE | 102017105669 A1 | 5/2017 |
| WO | WO 2007/101329 A1 | 9/2007 |

(Continued)

OTHER PUBLICATIONS

Machine translation of Wo-2011035400-A1, accessed on Sep. 28, 2020. (Year: 2020).*

(Continued)

*Primary Examiner* — Jonathan R Matthias

(57) ABSTRACT

This invention provides means and a method to eliminate emissions from an internal combustion engine during cold-starts and warm-starts. An oxidizer intake valve external to the engine head and an exhaust valve following the after-treatment system and condensing heat exchanger are closed, thus sealing all gasses inside the engine and the exhaust after-treatment system before starting the engine. Oxygen and hydrogen are used as the oxidizer and fuel to start this engine and operate this engine until the exhaust after-treatment systems have reached their required operating temperatures. This emissions-free startup system works equally well on two, four, six, or eight stroke engines, one or multiple cylinder engines, and spark or compression ignition engines. This invention also provides a means and method to clean the interior of an engine and the after-treatment systems of soot, particulate, and the catalytic surfaces without disassembling the engine or the after-treatment systems.

3 Claims, 3 Drawing Sheets

(56) References Cited

U.S. PATENT DOCUMENTS

| | | | |
|---|---|---|---|
| 5,839,273 | A | 11/1998 | Maus |
| 6,698,389 | B2 | 3/2004 | Andrews |
| 8,209,970 | B2 | 7/2012 | Gonze |
| 8,327,622 | B2 | 12/2012 | Sano |
| 2009/0320807 | A1 | 12/2009 | Cerny |
| 2011/0192139 | A1* | 8/2011 | Paik .................. F01N 3/005 60/274 |
| 2016/0115843 | A1 | 4/2016 | Mutsuda |
| 2016/0115910 | A1* | 4/2016 | Bramson ............ F02M 26/28 123/568.12 |
| 2016/0207029 | A1 | 7/2016 | Alive et al. |
| 2017/0037799 | A1 | 2/2017 | Balenovic |
| 2017/0106357 | A1 | 4/2017 | Xie |
| 2017/0167346 | A1 | 6/2017 | Barba |
| 2020/0040784 | A1 | 2/2020 | Von Ceumern-Lindenstjerna et al. |

FOREIGN PATENT DOCUMENTS

| | | | |
|---|---|---|---|
| WO | WO-2011035400 A1 * | 3/2011 | ............. F02B 43/10 |
| WO | WO2017060693 | 4/2017 | |
| WO | WO2017193673 | 11/2017 | |

OTHER PUBLICATIONS

Rodriguez, J., Cheng, W.,(2017), "Analysis of NOx Emissions during Crank-Start and Cold Fast-Idle in a GDI Engine," SAE Int. J. Engines 10(2):2017, doi:10.4271/2017-01-0796.

Reiter, M.S., Kockelman, K.M., "The Problem of Cold Starts: A Closer Look at Mobile Source Emission Levels," Transportation Research, Part D, 43: 123-132, 2016.

Titus, F., Berlet, P., Sobek, F., and Wessling, J., "Emission Reduction during Cold Start by Combustion Controlled Increase of In-Cylinder Temperatures," SAE Tech 2018-01-1740.

Yusuf, A.A., et al., "Effect of cold start emissions from gasoline-fueled engines . . . ," Case Studies in Thermal Engineering, vol. 14, 2019, 100417, ISSN 2214-157X, 2019.

Joshi, A., "Review of Vehicle Engine Efficiency and Emissions," SAE Int. J. Advances & Curr. Prac. in Mobility 1(2):734-761, 2019, doi:10.4271/2019-01-0314.

Joshi, A., "Review of Vehicle Engine Efficiency and Emissions," SAE Technical Paper 2020-01-0352, 2020, doi:10.4271/2020-01-0352.

http://butane.chem.uiuc.edu/pshapley/GenChem2/A10/2.html downloaded May 18, 2020.

Rhasa, D., and Zellner, R., (1987) Atmospheric Oxidation of Hydrocarbons, Free Radical Research Communications, 3:1-5, 199-209, DOI: 10.3109/10715768709069785.

Lewis, B., & Von Elbe (1987). Combustion, flames and explosions of gases: The Cambridge series of physical chemistry, The University press. 3rd Edition.

Zabetakis, M. G., (1965), "Flammability Characteristics of Combustible Gases and Vapors," Bureau of Mines, Bulletin 627, 1965.

Lefebvre, A., Freeman, W., Cowell, L., (1986), "Spontaneous Ignition Delay Characteristics of Hydrocarbon Fuel/Air Mixtures," Nasa Contractor Report 175064, 1986.

\* cited by examiner

EMISSION-FREE COLD-START AND WARM-START OF INTERNAL COMBUSTION ENGINES

CROSS-REFERENCE TO RELATED APPLICATIONS

Not applicable

FEDERALLY SPONSORED RESEARCH

Not applicable

SEQUENCE LISTING OF PROGRAM

Not applicable

BACKGROUND OF THE INVENTION

This invention eliminates the emissions from reciprocating internal combustion engines during cold-starts and warm-starts. It also provides for cleaning the insides of engines and after-treatment systems while not operating.

DESCRIPTION OF PRIOR ART

The internal combustion engine (ICE) has been used commercially since 1860. J. J. E. Lenoir invented this engine. It was followed in 1867 by an engine design from Eugen Langen and Nicolaus Otto, followed by the Otto cycle engine in 1876. In the last 60 years, there has been an ever-increasing concern about the emissions of carbon monoxide (CO), carbon dioxide ($CO_2$), unburned hydrocarbons (HC), particulate matter (PM), particle number (PN), and nitrous oxides (NOx). All of these emissions have been drastically reduced during this period except $CO_2$. Even $CO_2$ emissions have been reduced but only in relation to the increase in the thermal efficiency of the ICE. There is still one issue that is limiting the minimum level of emissions, and that is emissions during cold-starts and warm-starts. Cold-start is defined as the engine starting from ambient temperature while a warm-start is defined as an engine start with one or more temperatures below normal. This is an issue because the catalysts used to convert CO, HC, PM, and NOx to $CO_2$, $H_2O$, and $N_2$ operate at a relatively high temperature and perform limited conversion during heat up. Emissions are higher when ambient temperatures are lower because more heat and time are required for the catalysts to reach operating temperature.

State of the art engines are equipped with a variety of after-treatment systems which include, but are not limited to, particulate filters (GPF and DPF), oxidation catalysts (GOC and DOC), three way catalyst (TWC), a source of ammonia and its distribution, one or more selective catalytic reduction (SCR) systems, and ammonia slip catalyst (ASC) system. These systems are needed to meet government mandates on emissions. These mandates are becoming more stringent with time. The after-treatment systems must reach a temperature of approximately 300 to 400° C. (572 to 752° F.) to operate efficiently. This heat-up occurs typically within the first few minutes of the engine starting. During this time of startup, emissions are heightened.

Rodriguez et al. (2017) report that 80% of allowable HC and PM emissions and 60% of allowable NOx emissions occur during the cold-start portion of the FTP-75 cycle.[1] An emission-free cold-start would eliminate these early emissions of HC, PM, and NOx, thus reducing the emissions on the FTP-75 cycle by 80% for HC and PM and 60% for NOx. Rodriguez et al. (2017) also report that 36% of allowable HC and 17% of PM occur in the first 4 seconds of a cold-start.[1] Reiter et al. (2016) report the following in their abstract: "Starting emissions are consistently found to make up a high proportion of total transportation-related methane ($CH_4$), nitrous oxide ($N_2O$), and volatile organic compounds (VOCs). After three to four minutes of vehicle operation, both the engine coolant and the catalytic converter have generally warmed, and emissions are significantly lower."[2] Titus et al. (2018) also point out the need to consider the condition of the combustion chamber in their abstract with the following statement: "The RDE test procedure is not clearly defined, potentially allowing high loads immediately after the engine start. Under such circumstances the combustion chamber features low surface temperatures impairing emission performance and in particular provoking the excessive generation of hydrocarbon and particulate emissions. It is therefore important not only to examine the heating of the catalytic converter during the cold start, but also the preconditioning of the combustion chamber itself."[3]

There are quite a few ways of addressing cold-start emissions in both technical literature and patents. These ways include but are not limited to 1. locating the TWC close to the engine exhaust valve, 2. preheating the catalyst by altering the operation of the engine to raise the temperature reaching the catalyst, 3. mix hydrogen with the fuel for a higher exhaust temperature, 4. using an afterburner located before the catalyst to allow for an earlier light-off of the catalyst, 5. adsorb or trap the emissions to be released after the catalyst has reached operating temperature, and 6. electrically heat the exhaust just before reaching the catalyst or heat the catalyst.

The different ways of addressing cold-start emissions are addressed as follows:

1. "Locating the TWC close to the engine exhaust valve" is basic good engineering practice to get the most heat as possible to the TWC.

2. "Preheating the catalyst by altering the operation of the engine to raise the temperature reaching the catalyst" has a profound influence on the emissions from an engine. Titus et al. (2018) report that newer technology, particularly "sailing," predicts that the number of restarts of an engine increases by 35 times the number of restarts for a conventional starter. Each of these is an opportunity for increased emissions, particularly HC, CO, and PM. "Sailing" is defined as rolling with the engine not running.[3] Combustion strategies are also varied to increase the exhaust temperatures by late ignition timing. This increased temperature of exhaust should result in allowing the catalyst to reach operating temperature earlier. Yusuf et al. (2019) report that HC reached a level of 3700 ppm and NO reached 2000 ppm in the first two cycles of a cold-start.[4]

3. "Mix hydrogen with the fuel during a cold-start would help to reduce harmful emissions," is declared by WO 2007/101329 A1. This application states, "A significant portion of the harmful emissions produced by a gasoline combustion engine are produced immediately after a "cold start," while the engine is running below normal operating temperature. Thus, even supplying hydrogen to the engine as it warms up would materially reduce the overall emission of harmful gases." This is made possible because the presence of hydrogen causes faster flame propagation. U. S. Patent Application 2009/0320807 A1 published Dec. 31, 2009, covered a system to add hydrogen gas to the intake of an ICE with the stated benefit of increased combustion efficiency, increased flame speed, and reduced combustion cycle thus reducing harmful emissions. U.S. Pat. No. 6,698,389 discusses the addition of stored hydrogen before a catalyst to preheat the catalyst but fails to claim this in the patent. U.S. Pat. No. 3,862,624 claims the use of hydrogen as the fuel and oxygen as the fuel in an operating internal combustion engine for its full-time operation and not just for cold-starts. This patent also claims that the recirculating gas is hydrogen with oxygen metered in to control the engine operation. This patent describes a closed engine with hydrogen and oxygen sourced as either a liquid or a gas. There are several issues with this patent other than claiming both hydrogen and oxygen as fuel. These issues are as follows: a. hydrogen is the excess reactant, and so the exhaust gas is hydrogen and water, which is about 16 times more voluminous than oxygen and water. b. The oxygen and hydrogen input into the engine control the engine speed and power. Hydrogen is 16 times more voluminous on a mass basis than oxygen, so only a small volume of the limiting reactant ($O_2$) can enter the combustion chamber on each cycle. c. The input into the combustion chamber, consisting of crankcase ventilation ($H_2$, $H_2O$, $O_2$, and oil vapor), recirculating exhaust gasses ($H_2$ and $H_2O$), fresh $H_2$, and fresh $O_2$ is a combustible mixture. Zebatakis (1965), on page 89, gives the flammability limits at 25° C. of hydrogen in oxygen as 4% to 95% by volume.[27] Hydrogen has one of the widest flammability limits of any chemical giving the significant potential for flashback before the combustible mixture enters the combustion chamber. d. Continuously running an engine on oxygen and hydrogen requires an external source of both of these, which is very impractical. On an equivalent heating value basis, 16 gallons of gasoline (100 pounds, 45.4 kg) would be equivalent to 16.24 Kg (35.77 pounds) of hydrogen. The hydrogen occupies 25,749 liters at 7 bara (101.5 psia) as gas or 228 liters at –252° C. (60.23 gallons at –421° F.) as a cryogenic liquid. The oxygen requires 12,878 liters at 7 bara as gas or 112.8 liters at –219° C. (29.8 gallons at –362° F.) as a cryogenic liquid. The equivalent added weight from hydrogen and oxygen is 319 pounds, while the total volume as cryogenic liquids is 90 gallons.

4. "Using an afterburner located before the catalyst to allow for an earlier light-off of the catalyst" is covered by U.S. Pat. No. 5,425,233 in which a fuel-rich exhaust is oxidized with added air before the catalyst to cause a rapid increase in catalyst temperature to reduce emissions from a cold-start. U. S. Patent Application 2020/0040784 A1 claims an external source of hot gas or burner to preheat the catalyst during a cold-start. Air is the oxidizer; thus, gasses are still exiting the system during catalyst heat up.

5. "Adsorb or trap the emissions during a cold-start to be released after the catalyst has reached operating temperature" is covered by U.S. Pat. No. 8,327,622 B2. The exhaust gas purifying apparatus is engaged or disengaged as needed during an engine start to remove harmful emissions. Recent applications for exhaust traps primarily for HC and NOx are DE102017105669A1, WO2017193673A1, WO2017060693A1, and US20170106357.

6. "Electrically heat the exhaust just before reaching the catalyst or heat the catalyst" is covered by U.S. Pat. No. 5,839,273, issued Nov. 24, 1998, and covers electrically heated catalyst before the cold-start or warm-start and during a restart. This patent also claims the addition of added fuel and/or air to raise the catalyst temperature. U.S. Pat. No. 8,209,970 B2 issued Jul. 3, 2012, covers the use of an electrically heated catalyst and its control during an engine start. Electrically heated catalysts are also covered by U. S. Patent Applications 20170167346, 20170037799, 20160207029, and 20160115843.

The solution to the cold-start and warm-start of internal combustion engines has not been solved. This is further confirmed in two recent reviews of engine efficiency and emission, both authored by Dr. Ameya Joshi. Joshi (2019) mentions "cold-start" or "cold-starts" 28 times and mentions in the abstract "The challenge is to reduce cold start and low load emissions, requiring innovative engine and after-treatment system solutions. Leading concepts include close-coupled SCR (selective catalytic reduction), use of passive NOx adsorbers, integration of SCR (selective catalytic reduction) on DPFs (diesel particulate filters), low temperature urea or ammonia injection, dual SCR, and active and passive thermal management to raise exhaust temperatures. Work is also underway on a new low load certification cycle."[22] Joshi (2020) mentions cold-start or cold-starts 23 times, and mentions in the abstract, "A major focus will remain on reducing cold-start emissions and studies for both diesel and gasoline engines are reviewed."[23]

The last item in "Description of Prior Art" has never been applied to engines, but it is listed as prior art because the proof cited dates from 1965 to 1987. One other way to reduce emissions from engines is to clean up the after-treatment system between the operation of the engine. This cleanup can occur with few additions to the invention disclosed here. Even though the engine is not running during this cleanup, there can still be active chemistry occurring, particularly the oxidation of hydrocarbons during the inoperative phase of the engine. This cleanup can occur by flooding the engine and the after-treatment system with a high concentration of oxygen. Combustion is the rapid oxidation of hydrocarbons. The slow reaction of hydrocarbons is termed oxidation. The same reaction is occurring but at a reduced rate. Several references are included to prove this point as follows:

1. "Hydrocarbons are released continually from living things or through the decomposition of living things on Earth." and "All hydrocarbons react in air to form carbon monoxide and then carbon dioxide through a series of reactions. The first step is always the reaction between the hydrocarbon and hydroxyl radical. With alkanes, the hydroxyl radical abstracts a hydrogen atom and forms a carbon-centered radical."[24]

$$CH_3CH_3 + HO \longrightarrow CH_3CH_2 + H_2O$$

2. D. Rhasa et al. (1987) state on page 199, "The earth's atmosphere is oxidative in nature. As a consequence the oxidation of hydrocarbons provides important coupling mechanisms with other oxygen containing trace gas families ($O_x$, $HO_x$, and $NO_x$). Moreover, although hydrocarbons are not generally considered as pollutants, their oxidation is responsible for the formation of secondary pollutants such as CO, $O_3$, PAN and aerosols.

Atmospheric oxidation of hydrocarbons is both initiated and continued by radical chemistry. Reactions between stable hydrocarbon species and $O_2$ are much too slow to create reasonable oxidation rates on a realistic time scale. This is true for both the gas phase and the condensed liquid phase, as represented in the atmosphere by clouds, fogs and rain drops. In this paper we will first present the mechanisms and kinetics of hydrocarbon oxidation and will then discuss how this oxidation couples with the level of $HO_x$. The latter is of particular importance since $HO_x$ represents the oxidative potential of the atmosphere."[25]

The earth's atmosphere is oxidative, and its oxygen vapor pressure is 0.21 atmospheres, while 100% oxygen at the same pressure has a vapor pressure of 1.0 atmosphere or 4.76 times higher. Concentrations of oxygen less than 100% would be less than 4.76 times higher. The temperature of the after-treatment systems when the oxygen is first introduced would also be much higher than ambient. Both the higher concentration of oxygen and increased temperature accelerate oxidation reactions.

3. Lewis and Elbe (1987), on page 96, state, "The general features of the oxidation kinetics of methane and higher hydrocarbons are illustrated in FIG. 22 by the explosion limit curves 5-8 which has been obtained by Townsend and co-workers." and "Curves 6 and 7 apply specifically to hexane and air but are characteristic for paraffinic hydrocarbons and related compounds in general."[26]

FIG. 22, from Lewis and Elbe (1987) on page 97, shows that hexane in air produces a cool flame between 280 and 340° C. and at a pressure of 2 atmospheres in air. The pressure inside an after-treatment system (21) would be about 1.0 atmospheres but with an oxygen molar composition up to 4.76 times that of air, depending on the oxygen concentration.

Lewis and Elbe (1987), on page 168, state, "Ketones do not form etherlike adducts with hydroperoxides and hence, as shown by curve 8 in FIG. 22, isobutane $(CH_3)_3CH$ does not produce cool flame. On the other hand, isooctane, such as 2,2,4-trimethylpentane, produces cool flame and two stage ignition because it contains a —$CH_2$— group, but as shown by curves 1 and 3 in FIG. 52, the cool flame domain is narrow and displaced toward higher pressure compared to n-octane which abounds in such groups."[26]

FIG. 52, from Lewis and Elbe (1987) on page 173, shows the cool flame region for n-octane, n-heptane, and isooctane to be between 240 to 340° C. and oxygen pressures between about 20 and 800 mm Hg (atmospheric air has an oxygen vapor pressure of 159 mm Hg, but pure oxygen at atmospheric pressure has an oxygen vapor pressure of 760 mm Hg). Higher molecular weight alkanes above n-octane and n-heptane have higher numbers of —CH2— groups added, which are responsible for cool flame, as stated above.

4. Zabetakis (1965) shows a similar relationship for n-propyl nitrate at 1000 psi in air in FIGS. 3 and 4 on pages 5 and 6 of this reference. This data shows the time delay before ignition of about 400 seconds at 170° C. These conditions are more distant than the previous data, but they do show a similar relationship.[27]

5. Lefebvre et al. (1986), in FIG. 2.1 on page 8, show the ignition delay for iso-octane at 635° C. to be proportional to $1/P^n$ or the reciprocal pressure raised to the power of 0.5 or $P^{-0.5}$.[28]

These five references all show that hydrocarbons continue to oxidize in the presence of oxygen, even if there is no flame or just a cool flame. If this were not so, then the earth would be filled with non-oxidized hydrocarbons since hydrocarbons are responsible for most of the odors we smell. Data is insufficient to determine the exact amount of conversion during the non-operating time of the engine. In this invention, the flooding of the after-treatment system and the engine with oxygen causes the locked in hydrocarbons to oxidize and be converted to $CO_2$ and $H_2O$ even while the engine is not operating. This conversion would be particularly beneficial for the particulate filter, either DPF or GPF, because particles are consumed, thus cleaning the filter.

BRIEF SUMMARY OF THE INVENTION

This invention presents the means required and the method to be followed to start an internal combustion engine (20) and to operate this engine (20) without emitting any gasses until the engine (20) and the exhaust after-treatment system (21) have reached their operating temperature. The method given includes cold-start, warm-start, and hot-start of an internal combustion engine (20). The customarily used oxidizer block valve (1) prevents the customarily used oxidizer from entering the engine (20), and the exhaust gasses are blocked in (25) before the engine starts. The word "customarily" refers to what is normally used in an engine. Air is usually the oxidizer, while hydrocarbons are usually the fuel used. Still, oxygen-enriched air or some other oxygen-enriched oxidizer, along with hydrogen, could be the oxidizer and fuel. It must be understood that hydrocarbon includes fuels with hydrogen and carbon atoms and may or may not include oxygen atoms with them. Onboard oxygen (2) and hydrogen (12) become the oxidizer and fuel during cold-starts and warm-starts. The products of the combustion of hydrogen with excess oxygen ($\phi<1.0$) are water vapor and oxygen. Some of the water vapor is condensed and removed from the exhaust (23) in a condensing heat exchanger (22). The remaining oxygen and water vapor are recirculated (24) to the engine intake port or ports (6). Hydrogen gas (12) is injected (14) into the combustion chamber with fresh oxygen (2) and recirculated oxygen and water vapor (24). The engine combustion chamber, exhaust manifold, and after-treatment system (21) rise in temperature when the engine (20) is operating. When the operating temperature is sufficient to light off the catalysts, the selective catalytic reduction systems, and the ammonia slip catalyst system in the after-treatment system (21), then the startup oxygen is replaced (1) with the oxidizer customarily used to run the engine. The exhaust system is unblocked (25) at the same time to release the exhaust. The exhaust at this point, using customarily used oxidizer (1) and hydrogen (12), primarily contains $N_2$, $H_2O$, $O_2$, and Ar. The fuel is then switched from hydrogen (12) to its customarily used hydrocarbon fuel. The exhaust (25) at this point is primarily $N_2$, $CO_2$, $H_2O$, $O_2$, and Ar. Following this transition, the exhaust from the exhaust after-treatment system (21) is the same as from a customarily operating engine, but with cold-start and warm-start emissions removed.

The hydrogen fuel (12) and the oxygen (2) used as the oxidizer can be sourced externally, but electrolyzing water to obtain both hydrogen and oxygen is the favored approach, but certainly not the only approach. Electrolyzing (30) water followed by compressing both gasses (31 and 32) before storage would be needed. There are numerous water electrolyzing processes available for accomplishing this separation.

REFERENCE NUMERALS FOUND ON THE DRAWINGS

Figure 1:
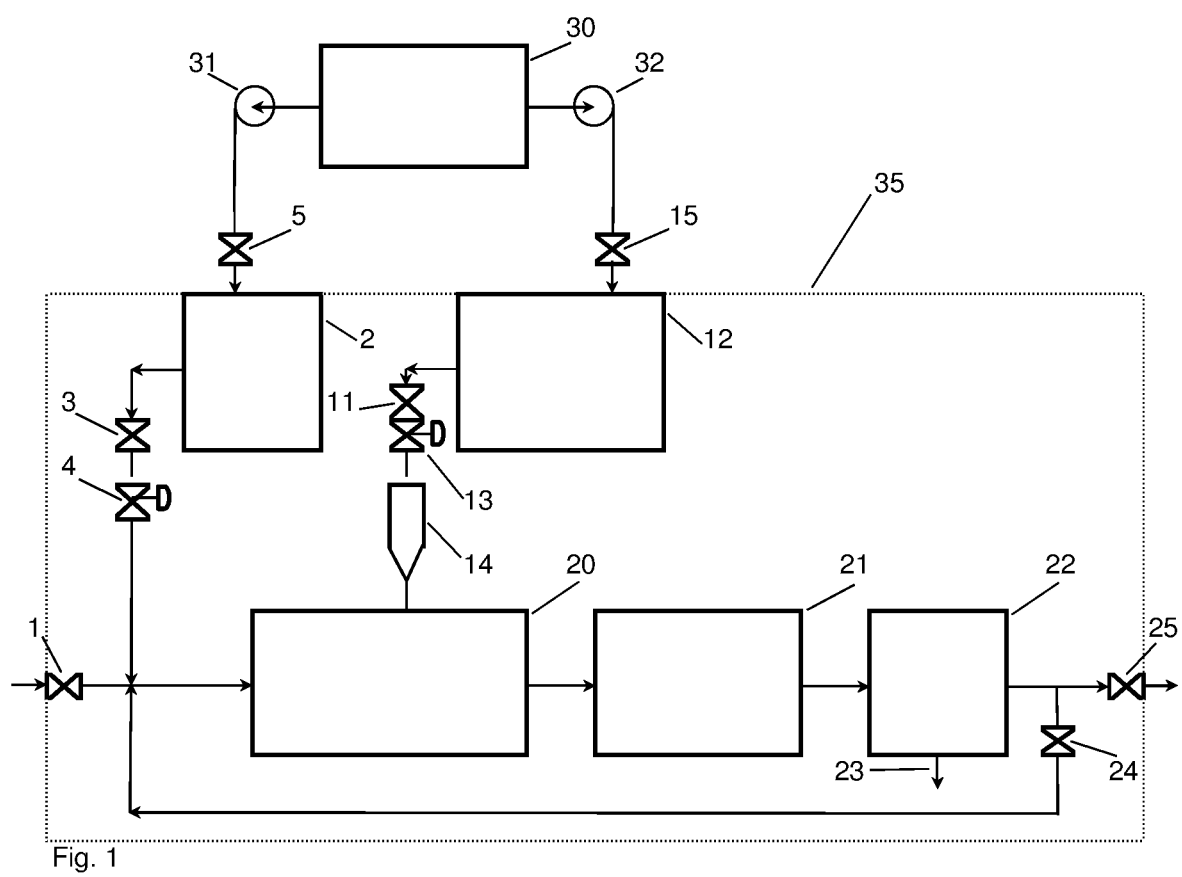
FIG. 1 shows the complete process, including the electrolyzer unit (30), which may or may not be present. It also defines what is meant by the overall engine system (35).
Figure 2:
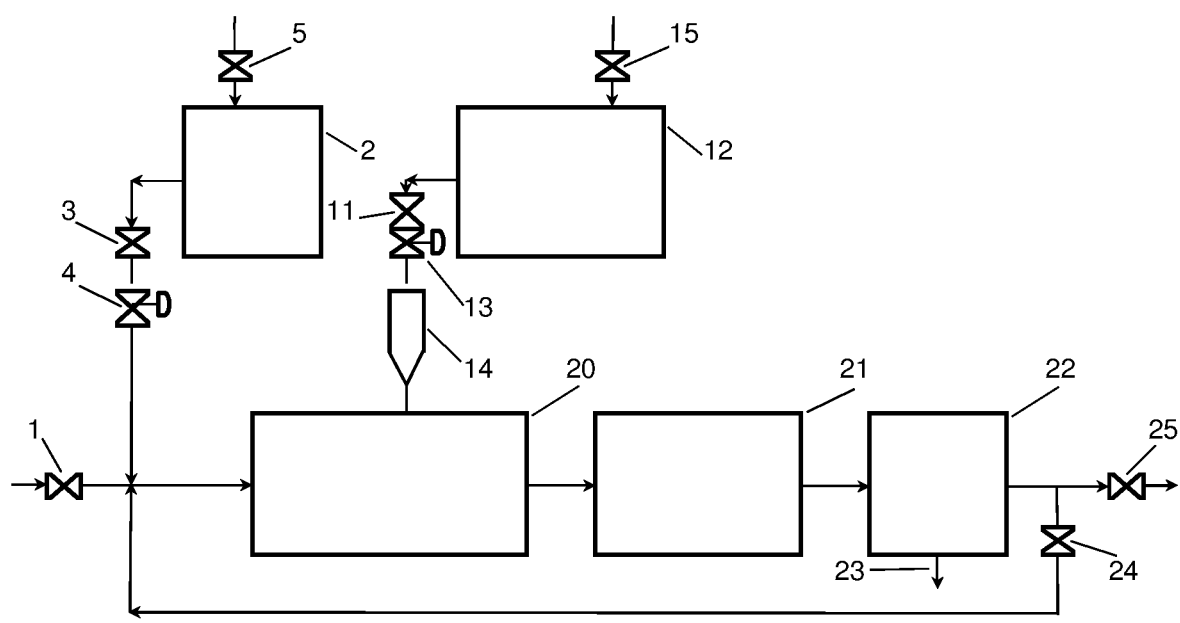
FIG. 2 shows the process without the electrolyzer unit, in which case, an external supply of both oxygen and hydrogen would be required.
Figure 3:
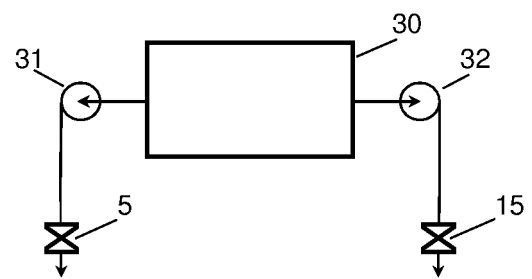
FIG. 3 shows the electrolyzer unit, complete with oxygen and hydrogen compressors.

1. Customarily used oxidizer block valve
2. Oxygen storage vessel
3. Oxygen block valve 4. Oxygen pressure regulator
5. Oxygen fill block valve
6. Inlet port or ports
7. Discharge conduit or conduits
11. Hydrogen block valve
12. Hydrogen storage vessel
13. Hydrogen pressure regulator
14. Hydrogen flow control valve
15. Hydrogen fill block valve
20. Internal combustion engine
21. Exhaust after-treatment system
22. Condenser
23. Water discharge
24. Exhaust gas recycle block valve
25. Exhaust gas block valve
30. Electrolyzer unit
31. Oxygen compressor
32. Hydrogen compressor
35. Overall engine system

DETAILED DESCRIPTION OF THE INVENTION

This invention covers the devices needed for diverting the customarily used oxidizer and fuel and using a secondary oxidizer and fuel so that there are no emissions during the starting of an engine. Methods are provided for two different starting events with those being cold-start and warm-start, and hot-start. The engine (20) uses this secondary oxidizer and fuel to warm up until the exhaust after-treatment system (21) has reached the required temperatures where the design conversion of CO, HC, PM, PN, and NOx is achieved. The oxidizer and the fuel used during cold-start and warm-start are oxygen and hydrogen and are provided from storage tanks (2 and 12) as compressed gasses. This compressed oxygen (2) and hydrogen (12) can be supplied from an external source, but supplying from an installed electrolyzer unit (30) with compressors (31 and 32) would be the preferred method of supplying these two gasses. Using an electrolyzer unit (30) to give the needed oxygen and hydrogen gas would require a supply of water, an electrically conductive chemical, and electricity. The oxygen and hydrogen generated would be compressed (31 and 32) and stored in pressure vessels (2 and 12). Block valves (5 and 15) stop the reverse flow of both gasses. The oxygen gas is blocked in by a valve (3) followed by a pressure regulator (4) to control the oxygen pressure entering the engine (20). Whenever the term "valve" is used, it is to be understood that "valve" is a device which blocks, throttles, and allows flow, and it may be any of the following, but not limited by this recitation: gate, globe, full port ball, reduced port ball, ball, butterfly, solenoid, actuated, pinch, sliding gate, plug, diaphragm, needle, injector, slide gate, iris, damper, control, check, regulating, Y, relief, safety, angle, and 3-way valve.

The engine (20) is started and run with excess oxygen, while the hydrogen from the hydrogen flow control valve (14) controls the energy input to the engine. The hydrogen gas is pressure regulated (13) to a constant pressure before reaching the hydrogen flow control valve (14) before entering the engine (20). The method used for cold-start and warm-start is covered first and then followed by hot-start.

Cold-Start and Warm-Start

Cold-start is the engine condition when everything is close to ambient temperature. Warm-start is the engine condition when one or more of the desired temperatures are low. The difference between cold-start and warm-start is the time required to complete the startup. This cold-start condition is much more severe during the cold months of the year, thus requiring more oxygen and hydrogen to reach operating conditions. During an engine cold-start and warm-start, the customarily used oxidizer is blocked off from entering the engine using valve (1). The intake port or ports are pressurized with oxygen from storage (2) through the oxygen block valve (3) regulated to low pressure by the oxygen pressure regulator (4) and exhaust gas block valve (25) is open to purge the engine (20), the after-treatment system (21), and the condenser (22). Valve (24) is held open briefly to purge this line and is then closed while the engine is turned over. After approximately two to six engine revolutions, valve (25) is closed, and hydrogen fuel is introduced through hydrogen flow control valve (14). This brief sweep of oxygen serves two purposes. One purpose is to remove non-condensable gasses so that only oxygen and water vapor are the constituents of the recirculating gasses. The other purpose is the removal of nitrogen, so that nitrogen does not form NOx during the engine start. At this point in the startup method, only oxygen via oxygen block valve (3) and oxygen pressure regulator (4) and hydrogen via hydrogen block valve (11), hydrogen pressure regulator (13) and hydrogen flow control valve (14) can enter the overall engine system (35) including the engine (20), the exhaust after-treatment system (21), the condenser (22), and the recirculated exhaust line via exhaust gas recycle block valve (24). The only outlet is via water discharge (23), and this is limited to condensed liquid water. Hydrogen via hydrogen flow control valve (14) is introduced as the engine (20) is started using the customarily used starter motor. The operating engine (20) is now exhausting hot gasses, consisting of only $O_2$ and $H_2O$, into the exhaust after-treatment system (21) and the condenser (22) where some of the water vapor is condensed from the gasses. The level of water removed is dependent on the temperature of recirculated gas, as it is saturated at the condensation temperature. The exhausting hot gasses are heating the combustion chamber(s), the head(s), the piston(s), the exhaust manifold(s) from the engine (20), the connecting conduits between the engine (20) and the exhaust after-treatment system (21), and the conduit to the condenser (22). The engine starts using lean combustion at an equivalence ratio between $\phi=0.2$ to $0.9$. Hydrogen gas has some of the widest flammability limits with a Lower Flammability Limit (LFL in air is 4%, or $\phi=0.135$) and an Upper Flammability Limit (UFL in air is 75% or $\phi=2.54$) as reported by Zabetakis (1965)[27]. The equivalence ratio chosen must give a reasonably high temperature but also provide very dependable combustion. Direct injection of hydrogen into the combustion chamber rather than port injection avoids flashbacks in the intake port of each cylinder. The engine (20) continues running until the exhaust after-treatment system (21) reaches its design temperatures. Cold-starts require a much longer run than warm-starts. The required temperature would allow the treatment system (21) to provide the design conversion of CO, HC, PM, PN, and NOx. This required temperature would be chosen based on the design of each of the processes inside the after-treatment system. Typical requirements for treatment systems are 250° to 450° C. for SCR and 350° C. for DOC or GOC, but these temperatures are very dependent on the technology chosen. The required hydrogen and oxygen to reach these temperatures during a cold-start are estimated at 363 grams of hydrogen and 2880 grams of oxygen. Storing of hydrogen at 150 bara requires 30 liters (1.06 ft$^3$), and storing of oxygen at 150 bara requires 15 liters (0.53 ft$^3$). Approximately six minutes of engine operation would be required to reach design conversion temperatures. The vehicle can operate during this heat up period but with power limited to about 22.4 KW (30 horsepower). These amounts of oxygen and hydrogen can be reduced by injecting hydrogen just before the unit with the highest temperature requirement and providing an ignition source. Upon reaching the required temperature, the engine would then switch to its customarily used oxidizer and fuel. The switch back to the customarily used oxidizer and fuel would involve opening valve (1), closing valve (3), and opening valve (25) to return to customarily used oxidizer while continuing to use hydrogen. Then switch from consuming hydrogen by stopping the hydrogen flow control valve (14) and begin using customarily used fuel at $\phi=1.0$, the condition for the three way catalyst to be the most effective. Shut off hydrogen injection before the after-treatment unit with the highest temperature requirement, if this had been chosen. Begin using environmental fluid or some other source of ammonia before the SCR for its proper operation.

Hot-Start

The engine control unit evaluates the temperature of the different processes in the after-treatment system. If all units have sufficient temperature, then the engine starts with customarily used oxidizer and fuel. There is no need for an emission-free startup since the emissions emitted are the same as a customarily operating engine.

Replenishment of Oxygen and Hydrogen

The engine control unit monitors the pressure of oxygen and hydrogen in the two storage vessels (2 and 12). If the pressure is below the set point, the electrolyzer unit (30) and both compressors (31 and 32) return the storage vessels (2 and 12) to the set pressure if the engine is equipped with an electrolyzer unit (30). This replenishment occurs as soon as the engine is operating to ensure the presence of adequate oxygen and hydrogen. If the engine has no electrolyzer, then the engine control unit signals the operator to top off or refill the vessels.

Hydrocarbon Oxidation

To clean the inside of the engine (20) and the exhaust after-treatment system (21), these systems are filled with oxygen. Oxygen fills the engine and the exhaust after-treatment system by sealing off customarily used oxidizer block valve (1) and opening oxygen block valve (3) to introduce oxygen into the engine. This procedure could be followed during the coast down of the engine or by rotating the engine using the starter motor. Two to six or more revolutions of the engine (20) are needed to get oxygen through the engine and into the exhaust after-treatment system (21). Valve (24) is closed after this conduit has been purged, allowing full flow of oxygen through the engine. Valve (25) is then closed after engine rotation, sealing the oxygen inside the engine (20), the exhaust after-treatment system (21), and the condenser (22). Valve (4) may then be close but with valve (1) remaining blocked.

In general, terms such as "coupled to," and "configured for coupling to," and "secured to," and "configured for securing to" and "configured for controlling" and "configured for allowing" and "configured for receiving" and "configured for removing" and "connected to" (for example, a first component is "connected to" or "is configured for connecting to" a second component) are used herein to indicate a structural, functional, mechanical, electrical, signal, optical, magnetic, electromagnetic, ionic or fluidic relationship between two or more components or elements. As such, the fact that one component is said to be connected to a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

The invention claimed is:

1. A method of operating an internal combustion engine, the internal combustion engine comprising:
   a. at least one cylinder and one crankshaft,
   b. an oxygen storage vessel containing oxygen,
   c. a hydrogen storage vessel containing hydrogen,
   d. an air block valve connected to an intake port of each said cylinder,
   e. an oxygen block valve connected to the oxygen storage vessel and the intake port of each said cylinder,
   f. a hydrogen block valve connected to the hydrogen storage vessel and each said cylinder,
   g. an exhaust port connected to each said cylinder, the exhaust port further connected to an exhaust after-treatment system and configured to convey the an exhaust gas to the exhaust after-treatment system,
   h. a condenser located downstream of the exhaust after-treatment system configured to reduce a water content of the exhaust gas from the exhaust after-treatment system,
   i. an exhaust gas block valve located downstream of said condenser configured to completely prevent the release of the exhaust gas to the environment, and
   j. an exhaust gas recycle block valve located downstream of the condenser that allows the exhaust gas to be recycled to the intake port of each said cylinder;
   the method of operating comprising the steps of:
   at the time of starting the internal combustion engine, determining the need for a cold-start or warm-start procedure, or hot-start procedure,
   a. wherein said cold-start or warm-start procedure is defined as one or more operating temperatures of the internal combustion engine being less than a predetermined temperature, and
   b. wherein said hot-start procedure is defined as all of said operating temperatures are equal to or greater than the predetermined temperature;
   when it is determined that a cold-start or warm-start procedure is needed, performing the steps of:
   a1. closing the air block valve and the exhaust gas recycle block valve,
   a2. opening the oxygen block valve and the exhaust gas block valve,
   a3. rotating the crankshaft of said internal combustion engine until each said cylinder, the exhaust after-treatment system, and the condenser are filled with said oxygen,
   a4. closing the exhaust gas block valve,
   a5. opening the exhaust gas recycle block valve and the hydrogen block valve,
   a6. combusting the hydrogen from the hydrogen storage vessel in each said cylinder to form the exhaust gas until the temperature of the after-treatment system reaches the predetermined temperature,
   a7. when the exhaust after-treatment system reaches the predetermined temperature, opening the air block valve and the exhaust gas block valve,
   a8. combusting hydrocarbon fuel in each said cylinder, and a9. closing the oxygen block valve and the hydrogen block valve, whereby no exhaust gas is emitted on starting the internal combustion engine.

2. The method of claim 1, further comprising:

when it is determined that a hot-start procedure is needed, performing the steps of:
   a. opening the air block valve and the exhaust gas block valve, and
   b. combusting hydrocarbon fuel in each said cylinder of the internal combustion engine.

3. The method of claim 1, further comprising:
a. generating the oxygen and the hydrogen using an electrolyzer system,
b. compressing the oxygen with a compressor before directing the oxygen to the oxygen storage vessel, and
c. compressing the hydrogen with a compressor before directing the hydrogen to the hydrogen storage vessel.

\* \* \* \* \*